J. P. SCOVILL.
TOBACCO LEAF STEMMING MACHINE.
APPLICATION FILED APR. 15, 1912.
1,067,147.
Patented July 8, 1913.
5 SHEETS—SHEET 3.
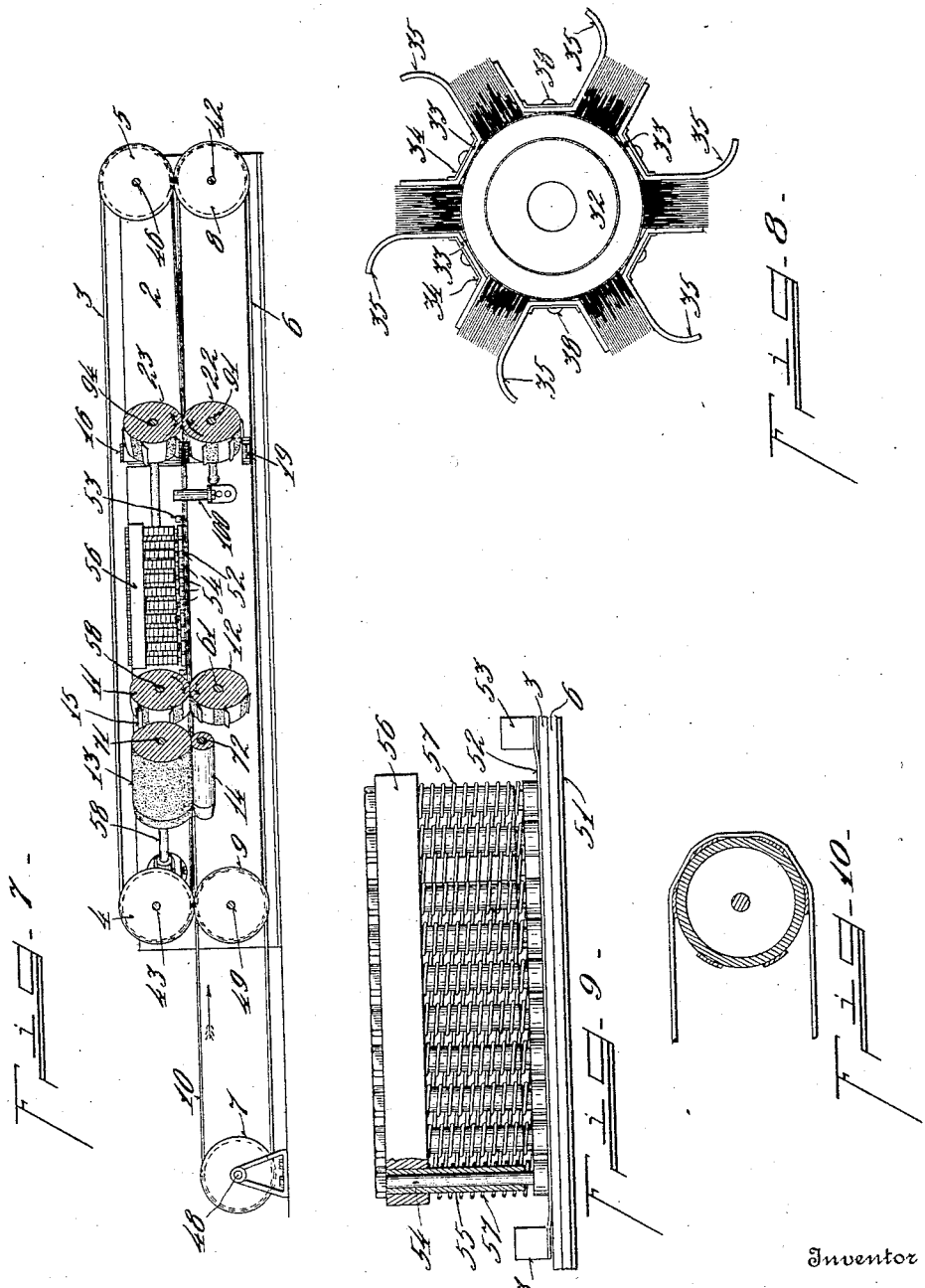
Witnesses
Oliver B. Kaiser
Emma Spener
Inventor
James P. Scovill
By Wood Wood & Nathan
Attorneys

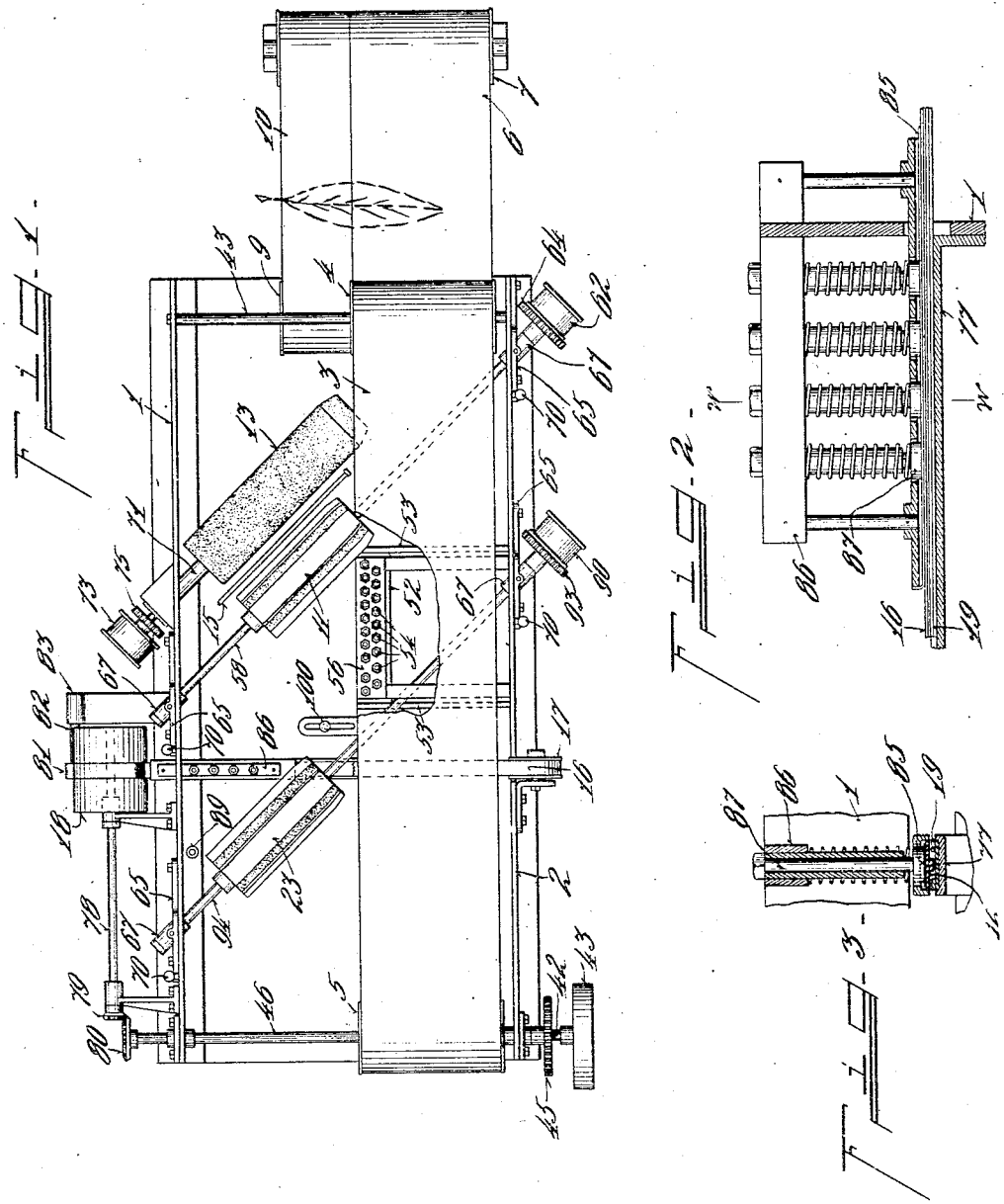

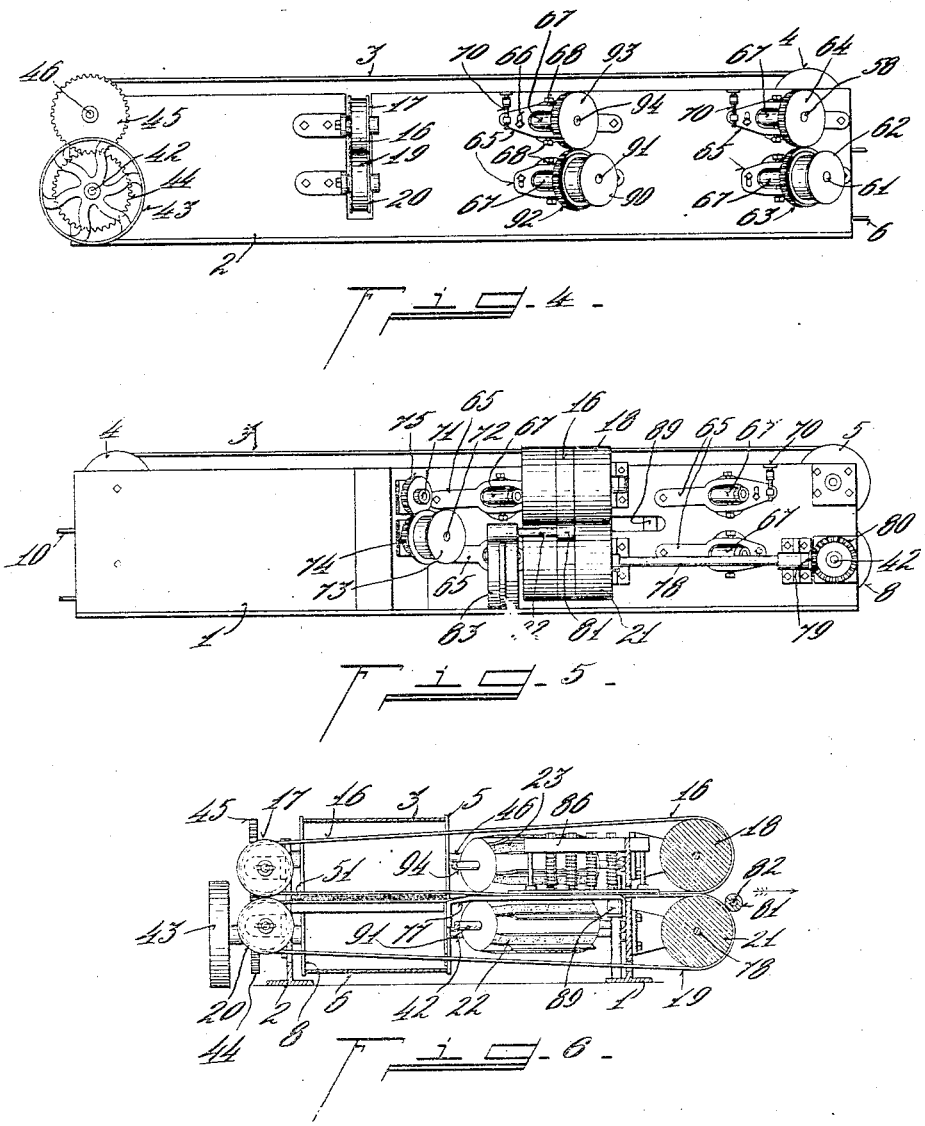

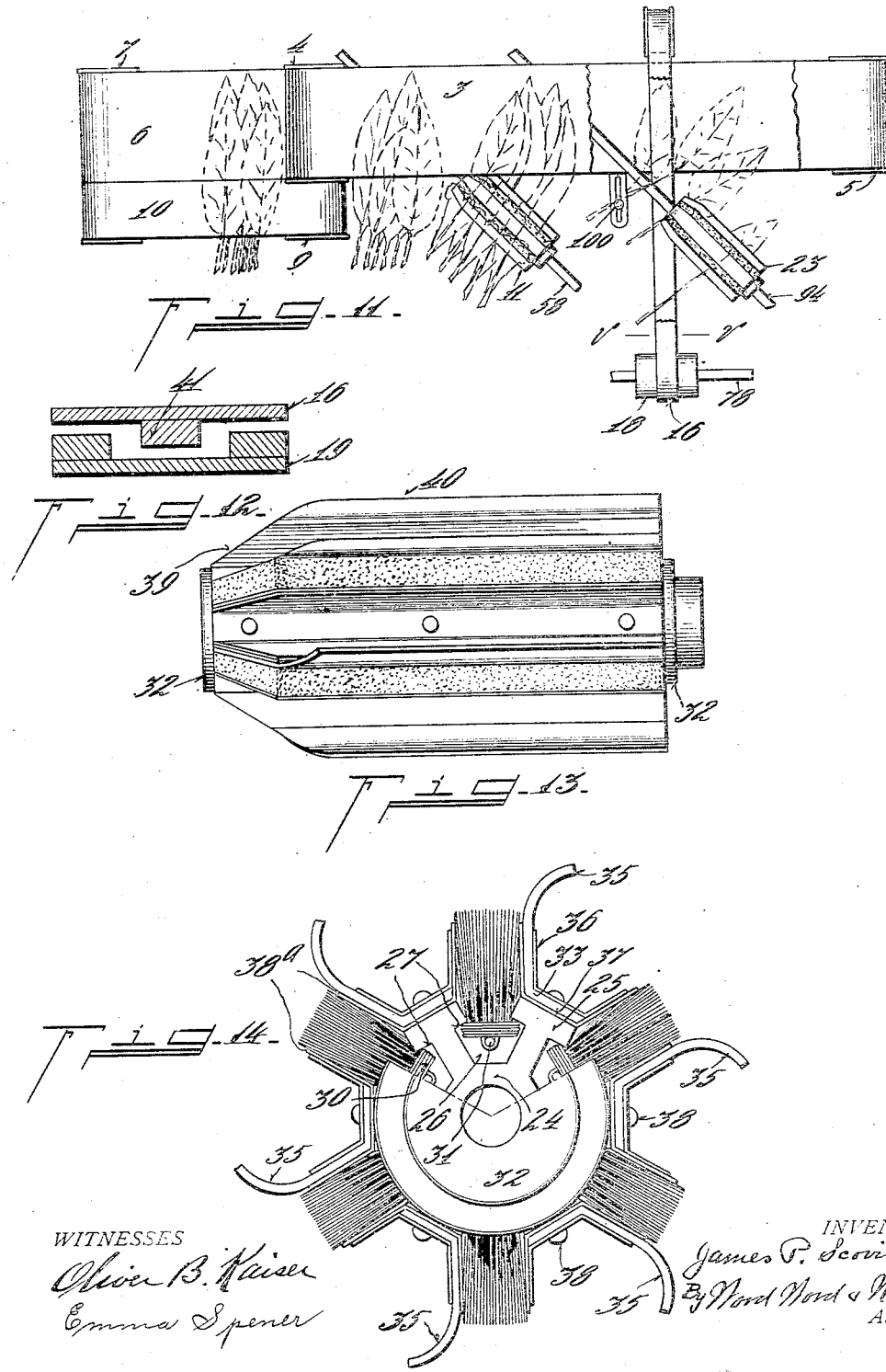

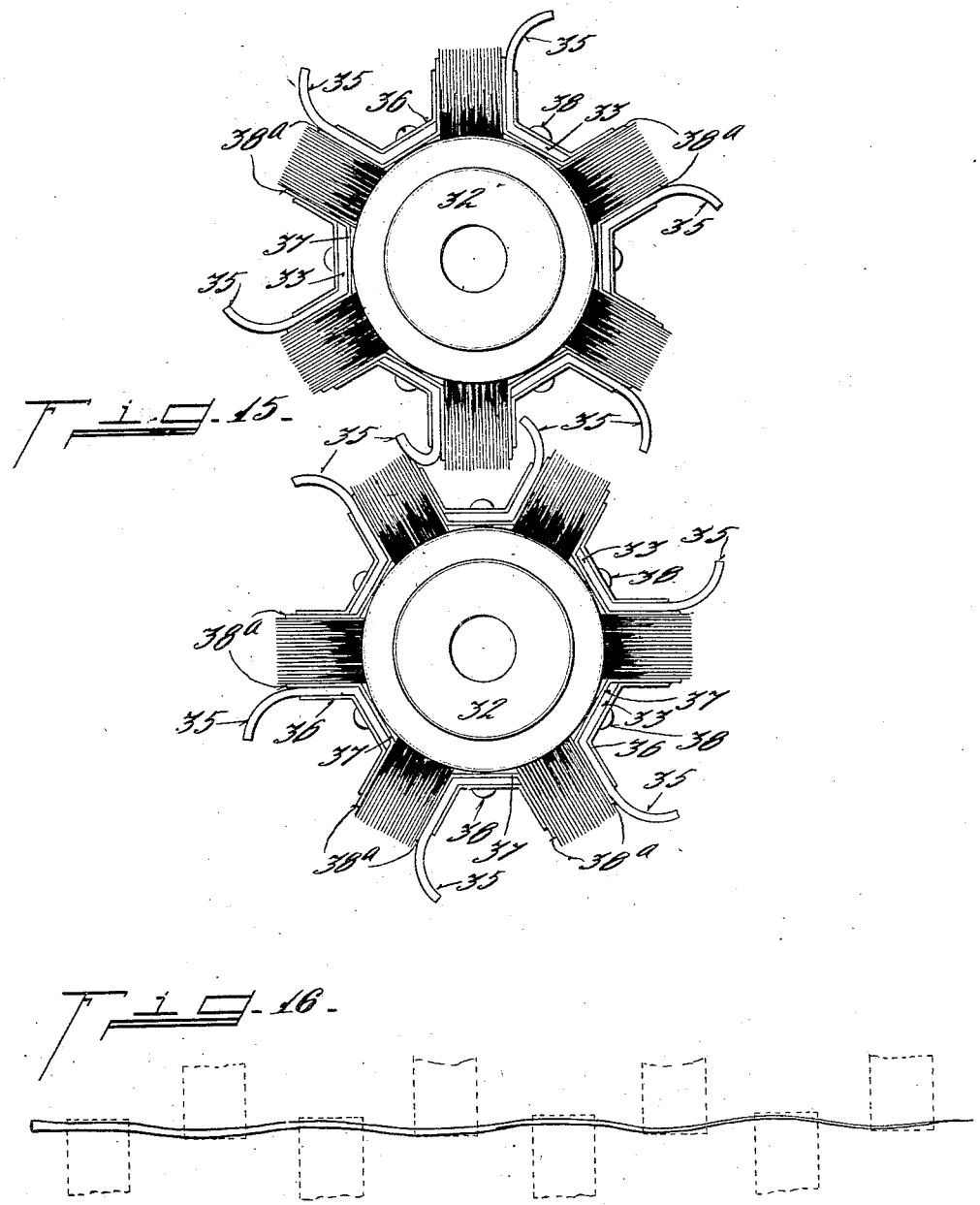

UNITED STATES PATENT OFFICE.

JAMES P. SCOVILL, OF WYOMING, OHIO, ASSIGNOR TO TROJAN MACHINE COMPANY, OF TROY, NEW YORK, A CORPORATION OF NEW YORK.

TOBACCO-LEAF-STEMMING MACHINE.

1,067,147. Specification of Letters Patent. Patented July 8, 1913.

Application filed April 15, 1912. Serial No. 690,863.

*To all whom it may concern:*

Be it known that I, JAMES P. SCOVILL, a citizen of the United States, residing at Wyoming, in the county of Hamilton and State of Ohio, have invented certain new and useful Improvements in Tobacco-Leaf-Stemming Machines, of which the following is a specification.

My invention relates to a tobacco leaf stemming machine.

The primary objects of the invention are:—The provision of mechanism for stripping the leaf in two operations, first in one, and then in the other direction of the stem. The provision of mechanism for pulling the stem in one direction while stripping, then pulling it at an angle to its first direction of travel for the second stripping. The provision of rolls having new stripping instrumentalities and characteristics. The provision of stripping instrumentalities, the components of which have differential resilience. The provision of a first pair of stripping rolls having relatively soft resilient stripping elements, and a second pair of rolls having relatively harsh resilient stripping elements, enabling the first stripping to be counter to the leaf grain, or toward the butt, and the second operation to be in the general direction of the grain, or toward the tip. The incorporation of leaf repelling elements into coöperative relationship with the stripping instrumentalities to increase the stripping efficiency and to keep them clear of the products tending to adhere thereto. The setting of the rolls with the stripping instrumentalities coacting in intermeshing relationship. The provision of means for rejecting short or broken leaves prior to the first stripping operation. The provision of means for appropriately delivering the leaves from the first pulling and stripping operation to the elements functioning for the second pulling and stripping operation. The organization of the two sets of pulling and stripping instrumentalities into a unitary system for sequential and continuous operation in a manner to prevent the stems from becoming broken by the counter forces of pulling and stripping, or by the method of transfer of the leaves from the first to the second stripping operations. The provision of an organized machine enabling the leaves to be expeditiously fed into the operative parts. The provision of means producing an efficient and uniform tension on the gripping carriers having capacity for automatic accommodation to the inequalities of different sizes and amounts of stems subjected to the stripping actions. To provide a rapid and efficient machine which will completely and cleanly strip the stems with the least percentage of loss and with the least danger of breaking the stems, and adapted to the varying exigencies incident to the different kinds and conditions of leaves obtaining in the commercial field.

I have shown in the accompanying drawings, forming a part of this specification, the preferred type of machine and the preferred structure, components, and organization of the respective elements, which in the light of this disclosure may be variously modified without departing from the teachings of the specification. These various features of the invention will be more fully described in connection with the accompanying drawings, forming a part of this specification, and showing the preferred embodiments thereof, in which—

Figure 1 is a top plan view of my tobacco stemming machine. Fig. 2 is an enlarged detail sectional view of a portion of the second stem gripping carrier illustrating a series of yielding plungers for maintaining the belts in gripping engagement with each other. Fig. 3 is a section on line $w$, $w$, Fig. 2. Fig. 4 is a side elevation of the machine. Fig. 5 is an end elevation of the opposite side of the machine from that shown in Fig. 4. Fig. 6 is a section on line $x$, $x$, Fig. 1. Fig. 7 is a central vertical section through the machine taken through the stripping rolls. Fig. 8 is an enlarged end elevation of one of the stripping rolls for initial stripping. Fig. 9 is an enlarged detailed side elevation of the spring actuated plunger mechanism for maintaining the main or initial stem gripping carrier belts in contact with each other and positioned in rear of the initial stripping rolls. Fig. 10 is a sectional view of one of the belt sheaves illustrating the periphery of the sheaves provided with longitudinal plates or bars projected from the periphery for engaging the belt. Fig. 11 is a diagrammatic top plan view of the initial or main carrier and stripping rolls, and the second carrier and stripping rolls. Fig. 12 is an enlarged section on line $v$, $v$, Fig. 11, through the adjacent ends of the cross or second carrier belts. Fig. 13 is a plan view of one of the second stripping rolls. Fig. 14 is an enlarged end elevation thereof with parts broken away to more clearly illustrate the construction of the roll and the method of mounting the brush segments. Fig. 15 is an end elevation of the second set of stripping rolls, illustrating their relative intermesh of the brush segments and coacting flaps. Fig. 16 is a diagrammatic view of the relative action of the stripper segments of the rolls upon the stem of the leaf passing the same between the rolls in an undulated path defining the limits of stem embedment into the stripping members.

While the mechanical elements of the machine shown in the drawings are quite numerous, the operative members unitarily considered are relatively few in number, simple in construction and assembled in a coöperative organization readily understood.

In order to first disclose the general principles of construction and mode of operation, I will first describe the preferred embodiment of the invention from its broader aspect and conclude with a description of the details of structure and arrangement, including the driving and transmission mechanisms.

The operative members comprise, a main or initial stem gripping carrier, a supplemental feeder coöperating therewith for entering the leaf, initial stripping rolls coöperative with the initial stem gripping carrier, rejecting rolls in front of and coöperating with the initial stripping rolls to separate out the short or broken leaves, a second stem gripping carrier arranged to coöperate with the initial carrier to shift the stem grip and direction of leaf travel, and stripping rolls coöperating with said second carrier.

*The initial stem-gripping carrier*, (see Figs. 1 and 7.)—The frame comprises the side members 1, 2, supporting the working members, as though they were set upon a table.

3 represents an upper endless belt turning on front and rear sheaves 4, 5, respectively.

6 is the coöperating under endless belt member turning on front and rear sheaves 7 and 8 respectively and riding over the intermediate sheave 9 vertically alined with sheave 4, so that the front end of belt 6 is projected forwardly in advance of sheaves 4 and 9. The sheaves 7 and 9 are longer than sheaves 4, 5 and 8, and upon the sheaves 7 and 9, at one side of belt 6, is a feeder endless belt 10, which is thus caused to rotate in the same planes as the forwardly extended end of belt 6, so that a leaf can be laid lengthwise thereon, as shown in dotted lines, Fig. 1, to be introduced to the gripping surfaces of belts 3 and 6, which grip takes hoid of one of the leaves as it passes between sheaves 4 and 9. These endless belts 3, 6, constitute the initial stem gripping carrier extending from the front to rear end of the machine, but arranged to release the grip at an intermediate point, as will be later explained.

*Initial stripping rolls*, (see Figs. 1 and 7.)—11, 12, represent the initial stripping rolls having stripping elements, to be later described in detail. These rolls are set in vertical alinement with their meeting tangential line in the horizontal plane of the gripping surfaces of belts 3, 6. These rolls are disposed at an angle to the belts 3, 6, and closely adjacent thereto, the apex of the angle being presented toward the front end of the machine, one or both of said rolls having tapered ends at this point to permit the free end of the gripped leaf to enter the stripping zone formed by the circumferential portions of said rolls at their common tangential line. The belts 3, 6, travel in a direction indicated by the arrow, Fig. 7, to advance the leaf from the front to the rear of the machine, and the rolls 11, 12, rotate relatively in the opposite directions, whereby the free portion of the leaf is drawn endwise between the rolls in opposition to the counter-drag imposed by the direction of rotation of said rolls relative to the direction of travel of the carrier belts, the stripping thus commencing at an intermediate portion of the leaf and working toward the end of the ungripped portion of the stem.

*Repelling instrumentalities.*—13, 14, represent rolls in front of and alined with rolls 11, 12, and rotating in the same general direction. Preferably the roll 13 is of greater diameter and has a fiber or brush-like peripheral surface, while roll 14 is a smaller, smooth roll. The stripping rolls and repelling rolls are in relatively close proximity. Between them and above them is the outlet 15 of a blower arranged to direct a blast of air downwardly between the rolls, the function of which is to catch the leaf matter freed from the stem by the stripping rolls and carry it downwardly with the air current, thus separating the initial leaf product from the stem and directing it into a suitable collector. The short or broken leaves will be caught by the repelling roll and thrown out to the front of the machine without being permitted to pass through the stripping rolls. The repelling rolls are preferably longer than the stripping rolls, so as to lie close to the initial stem gripping carrier, and also have tapered ends for convenient stem entrance.

The mechanism above described completes the initial stripping. In practice, I prefer to do the easier end of the stripping first, that is, the leaves are laid on belts 10 and the forward end of the belt 6, as shown in dotted lines Fig. 11, with the major portion of the tip ends of the leaf laid on belt 6, the butt ends lying on belt 10. After the leaves have been carried beyond the belt 10, these butt ends of the leaf are free and the tip ends gripped, so that these free ends are drawn between the rolls 11, 12, and stripped toward the butts or in a direction counter to the grain, which is a relatively easy operation as compared to stripping toward the tips or in the general direction of the leaf grain. After the first stripping operation, it is necessary to catch the initially stripped stems to draw them away from the first stripping carrier and to draw the unstripped portions of the leaf initially gripped between a second set of stripping rolls.

*Second stem gripping carrier*, (see Figs. 1, 11 and 6.)—16 is an upper endless belt turning on sheaves 17, 18, and 19 is an under belt member turning on sheaves 20, 21, these belts rotating in the direction indicated by the arrow in Fig. 6, that is, at the right hand side of the machine. These endless belts constitute the second stem gripping carrier, adapted to grip the stems between their opposing faces. These belts are arranged in a line intersecting the line of the belts 3, 6, preferably at right angles, with the gripping portions of the belts 3, 6, traveling between the gripping portions of the belts 16, 19. The rear sheaves 5, 8, for the belts 3, 6, are set slightly apart so as to cause the gripping portion of said belts to diverge from one another at their rear ends commencing at a point beyond the intersection of these belts with the belts 16, 19. By this means the tip portions of the leaf initially gripped are retained in the clasp of belts 3, 6, as they pass between the gripping portions of belts 16, 19, the latter belts being brought into gripping relation as they emerge from their intersection with belts 3, 6, the free ends of the stems initially stripped being thereby drawn between the gripping portions of belts 16, 19, at a point close to the edges of belts 3, 6, at this intersection angle, the gripping portions of belts 16, 19, being sufficiently open to receive the said initially stripped stems and immediately closing up to tightly grasp the stems. The initially gripped portions of the leaves are carried on by belts 3, 6, beyond this intersection, but the grip is gradually relaxed owing to the belt divergence, approximately at the time when the stripped stems are effectively gripped by belts 16, 19, and after the tip portions of the leaves have been carried on to a position substantially in rear of the second stripping rolls. To assist in properly directing the stripped portions of the stems into the grip of the second carrier and to influence the stem position preparatory to the second stripping operation, I preferably provide the guide 100 extending in a vertical plane parallel with belts 3, 6, and close thereto and just in front of the intersecting point of the carriers. The stripped portions of the stems are drawn through this guide by belts 3, 6, and slightly turned so as to enter between belts 16, 19, in a direction crosswise of the stems, the leaves gradually turning as the initial grip relaxes, so that the second stem gripping carrier draws the leaves away from the first carrier and through the second stripping rolls in a direction generally lengthwise of the stems, without bending a stem sharply upon itself in a way tending to snap the stem when subjected to the counter forces of a second stripping operation. By these means and this organization the grip is effectively shifted from the first to the second carrier, all the stems long or short are caught and retained by the second carrier, and even if a leaf is so laid on the feeder that it practically escapes the first stripping operation, it will be caught by the second gripping carrier and effectively stripped in the second operation. The result is that very minute or inappreciable amounts of the leaves fed to the machine escape the stripping operation and are delivered out between the rear ends of belts 3, 6, and any such accidental tailings can readily be restripped by again presenting them to the feeder end of the mechanism.

*The second stripping rolls*, (see Figs. 1, 7 and 11.)—22, 23, represent the rolls for the second stripping operation, they are positioned in rear of and substantially parallel with the first stripping rolls 11, 12, and just in rear of the second stem gripping belt carrier mechanism 16, 19. The second carrier takes the stems outwardly toward the right hand end of the machine, the rolls 22, 23, rotating relatively in the opposite direction or toward the rear end of the machine to provide the counter forces of pulling and stripping described in relation to the first operation. The second carrier and second stripping rolls have the same relation to one another as the initial carrier and initial stripping rolls have to one another, so that the second stripping action is substantially a duplicate of the first, except as to the new direction of travel of the stem and the different portions of the leaf operated upon in this final step. From this description it will be understood that after the first operation the initially stripped butt portions of the stems projecting beyond the belts 3, 6, are caught by the belts 16, 19, and pulled at right angles to the original direction of travel thereby drawing the stems away from the first carrier and in a direction lengthwise of the stems through the second stripping rolls, the stems entering the second grippers of the second rolls in a direction of movement presenting the stems crosswise to the second grippers and strippers. The stems are finally ejected at the outer ends of belts 16, 19, the sheaves 18, 21, being elongated to engage a considerable portion of the stem length and thus assist in this final discard of the stem.

*Character of the stripping rolls.*—The stripping rolls are substantially the same in general principles of construction but differ slightly in specific structure and arrangement due to the different portions of the leaf upon which they are designed to operate.

24 represents the hub of the roll from which radially project at regular intervals the T-shaped members 25, providing the axial grooves 26, the T-heads forming shoulders 27, thereby imparting under cut characteristics to said axial grooves.

The stripping elements preferably comprise different materials having different resilience, specifically the relatively weak bristles or fiber components and the relatively stiff-resilient wire components closely and promiscuously intermixed and compacted together so that their outer extremities form a continuous stripping surface shown in Fig. 13. To form and secure one of these stripping members, the fibers and wires are preferably bound together at their inner ends by strings 30, the wires being looped around the rod 31 so as to be anchored against endwise displacement. One of these composite unitary stripping members is slipped endwise into each of said grooves 26, the ends of the rolls then being closed by disks 32, the bound ends of the stripping elements are held between the shoulders 27. In this way the segmental series of strippers are secured to project radially from the roll with spaces between them represented by the T-heads. In the first set of stripping rolls, 33 represents axially extended strips of flexible material secured by means of plates 34 upon the T-heads, a portion of said material lies closely against the adjacent stripping member and is projected radially beyond the same constituting flexible flaps 35. Also, in the first stripping rolls the wire component is less than in the second stripping rolls for the reason that I preferably first strip the butt end of the stem in a direction counter to the leaf grain, while in the second operation, I preferably strip toward the tip or in a general direction of the leaf grain, which is a relatively more difficult operation, and to meet which I increase the proportion of the wire component of the second stripping elements. In the second rolls, I preferably secure these strips 33 between metallic plates 36, 37, by securing all three of these members to the T-heads by bolt 38.

In this form the inner plates 37 have members 38ª lying upon each side of the stripping elements and terminating below the stripping points. The material is closely compacted between these binders in a lateral direction, the result of which is that the resilient stripping elements yield in a direction substantially endwise of the roll instead of circumferentially under the influence of the stem pressure. Also, the outer extremities of these binders limit the depth to which the stem may be embedded into the yielding surface formed by the extremities of the stripping rollers. These flexible flaps operate to urge the product away from the stripping elements of the roll to which they are attached, and toward the stripping members of the opposing roll. The rolls so formed are set, as shown in Fig. 15, with the stripping members of one roll intermeshing with the open spaces of the opposing roll, so that as the rolls are rotated, the stripping members are brought to bear alternative upon opposite sides of the leaf, the leaf being forced by the stripping members into the opposing spaces first upwardly and then downwardly, thereby slightly flexing the stems as diagrammatically indicated in Fig. 16, thus insuring the proper degree of stem embedment into the stripping members alternately presented from above and below without opposing any abutments. Also, the stripping members are prevented from reacting upon one another and a proper clearance space is presented for the functioning of the flexible flaps 35.

*Relative rotations of speeds.*—The operation will be understood from the diagrammatic view in Fig. 11, in which the leaves are shown rather loosely laid on belts 6, 10, passing through the first stripping rolls in the same way so as to operate concurrently upon a number of leaves. This can easily be done owing to the nature of this first stripping counter to the leaf grain. The second stem gripping carrier is somewhat higher speeded than the first so that the leaves separate out as fast as they are caught by the second carrier to present them one at a time to the second stripping operation. The second stripping rolls are somewhat higher speeded than the first owing to the new direction of stripping relative to the leaf stems. These different speeds in conjunction with the different resilience of the stripping elements of each stripping member, and the generally stiffer character of the second rolls, enable this program of stripping to be successfully effected. As before explained, the stripping rolls have tapered ends 39, that is, the stripping elements, binders and flexible flaps are all tapered adjacent to the carrier in order to let the stems freely enter the circumferential portions of the roll 40, where the stripping is accomplished.

*Tension mechanism for augmenting the stem grip.*—In order to increase or produce an effective grip on the stems by the second carrier as they are drawn through the stripping zone, I first preferably form the meeting surfaces of the carrier belt with a tongue and groove formation 41, see Fig. 12, so that the stem is gripped with a clenching action. I also provide the tension means, shown in Figs. 1, 2, 3, 6, 7, and 9.

Having described the general features of construction, I will now describe the details.

*Driving mechanism for main stem gripping carrier.*—43 represents a pulley fixed to the shaft 42, serving as the main driving means for the carrier belts 3, 6.

44 represents a gear fixed upon the shaft 42 in mesh with a gear 45 fixed upon the shaft 46, the shaft 46 carrying the sheave or pulley 5, rotating the same and conveying motion to the belt 3. The sheave or pulley 8, of the lower carrier belt 6, is fixed to shaft 42 for driving said lower carrier belt.

47 represents an axle rod upon which the front sheave or pulley 4 is journaled and supported, and 48 represents an axle upon which the sheave or pulley 7 of the lower carrier belt 6 is supported and journaled. The pulley 7 is of a width to carry the belt 10, and the opposite end of the belt 10 is supported upon a pulley 9 journaled upon an axle 49 mounted upon the side frames 1 and 2, see Figs. 1 and 7. The belts 6 and 10 project beyond the belt 3 to provide a receiving area of belt prior to the engagement of the leaf between the belts 3 and 6, enabling the leaf to be arranged and distributed and present the leaves in separated form rather than in bulk. The adjacent runs of belts 3 and 6 move in the same direction, from the receiving end of belt 6, toward the driving shaft 42 and are adapted to pass between guide plates adjacent to the initial stripping roll to assist in maintaining the frictional contact of the stems between the runs of the belts to draw the same through the rolls. This guiding and tension mechanism produces an undulating action, so as to compensate for the various thicknesses of stems, without releasing any of them. This mechanism is preferably constructed as illustrated in Figs. 7 and 9. 51, see Fig. 6, represents a guide plate which is supported from the said frame 2, extending horizontally beneath the lower portion of the upper run of belt 6 and preferably extends between the sheaves or pulleys 8 and 9 to prevent its sagging. 52 represents a plate of flexible material, preferably sheet metal, secured to the supporting bars 53 projected from the side frame 2 and engaging against the upper portion of the lower run of belt 3, against which tension is brought to maintain the two belts in frictional engagement with each other. 54 represents plungers, each plunger being slidably mounted within a sleeve 55 fixed in the cross plate 56. The cross plate 56 is supported by cross arms projected from the side frame 2, see Fig. 1. 57 represents a spring engaging the plunger 54 and the cross head 56 for exerting downward pressure upon the plunger and flexible plate 52. A series of these spring actuated plungers are provided and supported longitudinally with the inner ends of the belts 3 and 6 and preferably in rear of the initial stripping rolls, with the plungers producing an undulating action upon the stem contacting run of upper belt to individually grip each stem irrespective of its thickness and without permitting a release of any stems of smaller diameter adjacent to a larger diameter stem. This insures positive carrier action on the stems in feeding the same through the stripping rolls.

The initial or main stripping rolls 11 and 12 are journaled at an angle to the main stem gripping carrier and preferably as follows:—58 represents a shaft, upon which the stripping roll 11 is mounted with the shaft journaled in the bearings mounted in the side frames 1, 2, respectively, and roll 12 is mounted upon a shaft 61 journaled in bearings supported upon the side frames 1 and 2. 62 represents a pulley, see Fig. 4, fixed to the shaft 61 carrying the stripping roll 12, which pulley may be driven from any suitable source of power supply. 63 represents a gear fixed to shaft 61 in mesh with a gear 64 fixed on shaft 58 for conveying motion thereto. These rolls travel in a direction opposite to the travel of the carrier and run at an appropriate speed to produce a proper stripping action heretofore described with the stem passing between the rolls. As illustrated in Figs. 4 and 5, the bearings of shafts 58 and 61 are mounted upon the side frames, with the bearing adjustable to enable the peripheries of the rolls 11 and 12 to be moved relatively toward each other to aline the same relative to the feeding instrumentalities and correlative to produce the proper stripping action. Each bearing comprises a plate 65 pivotally connected at one end to the side frame, the opposite end provided with a slot 66, through which a bolt passes for locking the plate in any vertically adjusted position. 67 represents a bearing sleeve mounted between the screws 68 projected through the bearing plate. A common form of construction of bearing may be employed which will automatically aline the shaft and thereby relieve the shaft of any strains. As these shafts are mounted in an angular plane relative to the stem gripping carrier, it is essential to the perfect operation of the rolls to mount the shaft in what may be termed floating bearings. 70 represents an adjusting screw supported on the side frame engaging a nut projected from the bearing plate 65 providing a micrometer adjustment, preferably for the upper roll. It is obvious, however, that any well known form of bearing may be provided containing the adjustable features above described for controlling the stripping rolls, and for maintaining their axial alinement.

As heretofore described, repelling rolls 13 and 14 are journaled in front of the main stripping rolls 11 and 12, and parallel therewith, with the roll 13 of brush formation, while the roll 14 has a smooth surface of a flexible character and preferably of rubber. Roll 13 is fixed upon a shaft 71 journaled in a bearing formed in the side frame 1, and roll 14 is fixed upon a shaft 72 journaled in a bearing formed in the side frame 1.

73 represents a pulley fixed on shaft 72, see Fig. 5, and 74 represents a gear likewise fixed on shaft 72 in mesh with a gear 75 for imparting motion or rotation to the upper roll 13. The pulley 73 is driven from any suitable source, and the shafts 71, 72, are mounted in bearings rigidly secured to the side frames as adjustment thereof is not necessary.

The rolls 13 and 14 are driven in the same direction respectively as the rolls 11 and 12 and serve as guard rolls to throw the broken or short leaves backward, which have been released from the stem gripping carrier to prevent the same from passing through the stripping rolls 11 and 12, as such leaf would have a tendency to interfere with the perfect operation of the machine and possibly clog the stripping rolls, owing to their release from a positive feed. The leaf in its travel passes between two sets of main stripping rolls 11 and 12 and repelling or guard rolls 13 and 14, with the stemmed leaf directed downward by means of an air blast jetting from the pipe 15 disposed intermediate of said set of rolls, which will influence the severed leaf or tissue and retard any feeding action thereof toward the stripping rolls and without effecting any action on the stem, but direct the loose tissue of the leaf downwardly into a receptacle or receiver. Owing to the angularity of the stripping rolls relative to the carrier mechanism, the stem has a tendency to travel from one end of the stripping rolls to the opposite end thereof, providing clearance for successive stems and divides the stems from each other, increasing the capacity of the roll, and also, is advantageous for properly presenting the leaf to the second stemming operation, that of stemming from the butt toward the leaf end. As the stems move forward out of engagement with the first set of stripping rolls, it is substantially simultaneously released by the main carrier mechanism and presented to and gripped by a second carrier mechanism moving at right angles to the first, which comprises the upper and lower belts 16 and 19, with the upper belt supported and carried by the sheaves or pulleys 17, 18, and the lower belt 19, by the sheaves or pulleys 20, 21.

As illustrated in Fig. 6 the adjacent gripping runs of the belts 16 and 19 travel respectively above and below the gripping runs of belts 3 and 6 in order to aline the stem gripping plane of the two sets of carriers.

77 represents a guide plate for directing the upper run of belt 19 toward the adjacent run of belt 16, to bring the same into engagement with each other after they pass the first set of carriers.

The pulleys or sheaves 17 and 18 and 20 and 21 are suitably journaled in brackets projecting from the side frames 1 and 2, see Figs. 1 and 6, with the pulley 21 fixed to a shaft 78 extended rearward toward the shaft 42 carrying the pulley 8 of the main feeding carrier mechanism, see Fig. 5.

79 represents a beveled gear fixed on the shaft 78 in mesh with a beveled gear 80 fixed on the shaft 42. Thus the power is conveyed through the beveled gears 80 and 79 to shaft 78, driving the pulley or sheave 21.

The upper belt 16 is driven by its frictional engagement with the lower belt 19, but it is obvious that transmission mechanism may be employed between the shafts of two adjacent pulleys of the cross carrier belts. The belts have a tendency to stretch considerably at times, depending upon the number of stems fed and to prevent slippage of the belt or belts upon their pulleys, I provide a roller 81, see Figs. 5 and 6, adapted to engage the belt preferably upon the driving pulley and thereby maintain the belt in driving contact with its pulley. The roller 81 is journaled upon a rod 82 projected from a bracket 83, but it is obvious that other means may be employed for accomplishing the same results.

The cross or second carrier mechanism is also provided with tension mechanism constructed substantially the same as heretofore described for the main carrier mechanism, comprising a series of spring controlled plungers bearing upon an elastic plate. This mechanism is shown in Figs. 2, 3, and 6. 85 represents an elastic plate bearing against the meeting runs of the carrier belts 16, 19, and 86 represents a cross plate for supporting the spring actuated plungers 87. These produce the same undulating action, as heretofore described, as the stems pass the plungers for effectively gripping each stem. This, together with the intermeshing effect of the belts 16 and 19 longitudinally with the travel thereof insures a very secure gripping of each individual stem, irrespective of the irregularity of the diameters of the stems, with each stem gripped against displacement in its feeding direction with the carrier, and pulling direction through the second set of stripping rolls. The carrier belts 16 and 19 convey the stems to a point of discharge. 89 represents a guard roll supported upon the side frame 1, see Figs. 1 and 6, adjacent to the ends of the second stripping rollers 22, 23, to prevent the stems from passing beyond such end of the rolls.

The second set of stripping rolls having been heretofore described in detail, I will now describe the transmission mechanism therefor.

90 represents a pulley, see Figs. 1 and 4, mounted upon a shaft 91, upon which shaft the lower stripping roll 22 is mounted or fixed, and which shaft is supported in adjustable floating bearings mounted upon the side frames 1 and 2. The construction of the bearings is substantially the same as has heretofore been described for the first set of gripping rolls.

92 represents a gear fixed upon shaft 91 in mesh with a gear 93, fixed upon shaft 94, upon which shaft is mounted the upper stripping roll 23 of the second set of stripping rolls.

The pulley 90 is driven from any suitable source of power and the upper shaft 94 is also mounted in adjustable floating bearings, enabling the two rolls 22, 23, to be adjusted relatively to each other.

As shown, the two sets of stripping rolls and repelling rolls are driven by independent belt transmission and at speeds varying relatively to each other, as heretofore described, being the preferred form of transmission, but it is obvious that a single driving belt may be employed for the combined series with trains of gearing connecting the shaft of the various rolls without departing from the features of my invention. In fact, the specific details of construction herein shown and described for driving the various rolls, their relative positions and the feeding or carrier mechanism for the stems may be variously modified as long as they possess the essential characteristics referred to at the beginning of this description of my invention.

From this disclosure it will be apparent that my invention comprises, mechanism for gripping the stem of the leaf near one end, drawing the ungripped portion through stripping rollers working in opposition to the travel of the leaf, then delivering the stripped portion of the stem into the grip of the second pulling instrumentality, causing the leaf to travel at an angle to its first direction of travel, and drawing the unstripped portion of the leaf initially gripped through a second set of stripping rolls, working in opposition to the new direction of travel. The stem must be gripped with a degree of tension sufficient to withstand the counter-drag of the stripping rolls, which is a constant and considerable force exerted in opposition to the direction of pull of the stem gripping carrier, and the relationship and character of the two stem gripping carriers is shown to be such, that the stems are not bent into sharp angles at any point in their travel, since these counter forces of pulling and stripping will snap the more fragile stems if they are permitted to be so bent.

In the preferred arrangement shown, the second grip catches the butt portion of the initially stripped stem at a point immediately adjacent to the line of travel of the initial stem gripping carrier, so that all the stems, long or short, are necessarily caught by the second stem gripping carrier. The new direction of travel draws the initially gripped portion of the leaf away from the initial gripping carrier and through the second stripping rolls, following a path substantially corresponding to the line occupied by the stem as initially gripped, thereby preserving the same relative positions and conditions of gripping, pulling and stripping in each of these sequential operations.

When the tip stripping rolls are made as shown, the peripheral elements comprise binding elements, as well as relatively stiff resilient members, that is, the wires, and relatively soft resilient members, that is, the fibers, so that the strippers unitarily considered somewhat correspond as to their components to the different physical characteristics of the product to be treated, comprising stems, veins and leaf web, of differentially graded strength and texture.

A flexible strip or strips of the character shown presents a loose portion expanding under the influence of centrifugal force providing a radially yielding surface functioning when expanding to clear the stripping extremities and to urge the product toward the opposing strippers, and functioning when yielding under the pressure of leaf presentation to more or less effectively expose the strippers enabling them to separate the web from the stem without unduly mauling the stripped product.

Inasmuch as the veins, and even the web, are tougher and of more tenacious attachment at the butt end of the stem, there is great practical advantage in stripping this end of the leaf first, and in a direction counter to the grain, while the veins and web being relatively more tender toward the tip end of the leaf, in the second operation the separation is easily effected by drawing the tip between the second stiffer rolls in the direction toward the tip, or with the grain. If the tip end of the leaf were stripped first it would be more difficult for the second carrier to grip and hold the cleaned, fragile tapering end of the stem, and the stems would be more liable to break in the second stripping operation. Another useful result is the production of an efficient and uniform tension on the stem gripping carriers, to increase the gripping functions and to automatically accommodate the grip to the inequalities of different sized stems, whereby a great number of stems of different size may be concurrently handled by the belt carrier. Another result is the provision of a machine which is very rapid as well as efficient in its operation, which completely and cleanly strips the stems, and in which a large quantity of stems can be stripped at the same time without any great care on the part of the operator in placing the stems on the initial feeding belt. In other words, the bundles of leaves can be simply cut and loosely laid upon the receiving belt. Another useful result is the provision of means for rejecting the broken or short leaves to prevent their being passed through the machine and to deliver the rejected matter separately from the finished leaf product. The pair of rejecting rolls is arranged parallel to, adjacent to, and in front of the first pair of stripping rolls, and rotating in relatively the same direction, that is, in the direction tending to throw broken or short leaves backward and not permitting them to go through the first pair of stripping rolls. It is well known that in a bundle of leaves there will be some short or broken leaves and also some very slender or delicate stems, some of which may be broken by the action of the first pair of stripping rolls. It is therefore desirable to separate the broken leaves from the cleaned strips.

The provision of relatively weak resilient stripping elements for the first operation and relatively stiff resilient stripping elements for the second operation, enables the stripping of the butt end first in a direction toward the butt, and the final stripping of the tip portion initially gripped in a direction toward the tip. This order of stripping in association with strippers having definite differential efficiency is of the utmost importance in producing uniform results and completely and closely stripped stems. The rotation of the second rolls and the second carrier at relatively higher speed ratios than the first rolls and first carrier, is of material assistance in effecting this particular method of stripping.

Having described my invention, I claim—

1. In a tobacco leaf stemming machine, a stem gripping carrier, coöperating stripping rolls, means adapted to grip the stripped portion of the stem and pull it at an angle to the direction of travel of the initial stem gripping carrier, and stripping instrumentalities coöperating with said means to complete the stripping.

2. In a tobacco stemming machine, two sets of stem gripping carriers and stripping rolls, said carriers and rolls being arranged and operated so that one end of the leaf is gripped while the other end is stripped, and then the stripped end of the stem is gripped while the other end of the leaf is stripped, and means rendering a differential stripping efficiency in the two operations, the minor efficiency stripping being toward the butt and the major efficiency stripping being toward the tip of the leaf.

3. In a tobacco leaf stemming machine, means for gripping the stem and successively drawing the leaf first in one line of travel and then in another line of travel, stripping instrumentalities adapted to operate upon the leaf in each of its lines of travel, and means transposing the order of leaf advancement intermediate the two stripping operations whereby the opposite ends of the leaf are stripped in successive operations.

4. In a tobacco leaf stemming machine, a stem gripping carrier, two sets of stripping rolls located upon one side thereof and at an angle thereto, and a second pulling device located upon the same side of the carrier, adapted to grip the stripped portion of the stem and draw it angularly away from the stem gripping carrier and through the second set of stripping rolls.

5. In a tobacco leaf stemming machine, a stem gripping carrier, stripping rolls therefor, pulling means adapted to grip the stripped portion of the stem and draw the leaf at an angle to its first direction of travel and away from the stem gripping carrier, and stripping rolls for said second named pulling devices, both of said stripping instrumentalities and the supplemental pulling devices being positioned wholly upon one side of the initial stem gripping carrier.

6. In a tobacco leaf stemming machine, a stem gripping carrier, an angularly disposed pair of stripping rolls therefor, gripping and pulling means adapted to grip the stripped portion of the stem after the first operation to draw the initially gripped leaf portion from the first carrier, a pair of stripping rolls coöperating with said second gripping and pulling means to complete the stripping, said first rolls having stripping elements relatively soft, adapted to operate counter to the leaf grain, enabling the butt end of the stem to be first stripped in this direction, and said second rolls having relatively harsh stripping elements, enabling the tip portion of the leaf initially gripped to be finally stripped in the general direction of the leaf grain.

7. In a tobacco leaf stemming machine, two sets of coöperating stem gripping leaf propellers operating in intersecting lines of travel, and stripping devices coöperating with each of said stem gripping propellers.

8. In a tobacco leaf stemming machine, in combination with two independent stripping instrumentalities, two pairs of stem gripping carrier belt mechanisms arranged in intersecting planes and adapted to transfer the stem grip approximately at the line of intersection, and means coacting with said carriers determining the stem positioning at the time when the grip is shifted.

9. In a tobacco leaf stemming machine, in combination with two sets of stripping instrumentalities, an initial stem gripping carrier belt mechanism adapted to present one end of the leaf to the first stripping instrumentality, a second stem gripping carrier mechanism intersecting the line of travel of the first carrier, the gripping surfaces of the first carrier passing between the gripping surfaces of the second carrier enabling the grip to be shifted, and the other end of the leaf to be presented by the second carrier to the second stripping instrumentality.

10. In a tobacco leaf stemming machine, in combination with two sets of stripping instrumentalities, an initial stem gripping carrier belt mechanism adapted to present one end of the leaf to the first stripping instrumentality, a second stem gripping carrier mechanism intersecting the line of travel of the first gripping carrier, the gripping surfaces of the first carrier passing between the gripping surfaces of the second carrier enabling the grip to be shifted.

11. In a tobacco leaf stemming machine, in combination with two sets of stripping instrumentalities, an initial stem gripping carrier belt mechanism adapted to present one end of the leaf to the first stripping instrumentality, a second stem gripping carrier mechanism intersecting the line of travel of the first carrier, the gripping surfaces of the first carrier passing between the gripping surfaces of the second carrier, and means relaxing the effective grip of the first carrier at a point beyond said intersection, enabling the grip to be shifted and the other end of the leaf presented by the second carrier to the second instrumentality.

12. In a tobacco leaf stemming machine, in combination with two sets of stripping instrumentalities, an initial gripping carrier belt mechanism adapted to present one end of the leaf to the first stripping instrumentality, a second stem gripping carrier mechanism intersecting the line of travel of the first carrier, the gripping surfaces of the first carrier passing between the gripping surfaces of the second carrier, means relaxing the effective grip of the first carrier at a point beyond said intersection, and means adapted to be engaged by the initially stripped stems at a point in advance of said intersection determining the stem positioning at the time the grip is shifted and enabling the second carrier to present the other end of the leaf to the second stem gripping carrier.

13. In a tobacco leaf stemming machine, two coacting stems of stem gripping carrier belt mechanisms operating in intersecting planes, the gripping surfaces of the first carrier passing through the gripping surfaces of the second carrier, means relaxing the effective grip of the first carrier at a point beyond the intersection, a pair of stripping rolls angularly arranged in juxtaposition with the first carrier, a second pair of stripping rolls angularly arranged in juxtaposition with and in rear of the second carrier, and means coacting with said carriers influencing the stem position during the period when the stem grip is shifted.

14. In a tobacco leaf stemming machine, a pair of stem gripping carrier endless belts, the lower member being projected forwardly beyond the upper member, a coöperating carrier endless feed belt arranged in parallelism with the extended end of the under belt member of the stem gripping and carrier mechanism coöperating therewith to hold the leaves in extended position at the gripping point, and a pair of angularly arranged stripping rolls disposed to one side of said stem gripping carrier.

15. In a tobacco leaf stemming machine, a pair of stem gripping carrier endless belts, two pairs of stripping rolls arranged in approximately the same angle relative to the line of the belts and positioned upon the same side thereof, and a second stem gripping carrier instrumentality operating between the two sets of stripping rolls adapted to catch the initially stripped stem and draw the unstripped portion of the leaf through said second stem gripping rolls.

16. In a tobacco leaf stemming machine, a pair of stem gripping carrier endless belts, two pairs of stripping rolls arranged approximately in the same angle relative to the line of the belts and positioned upon the same side thereof, and a second pair of stem gripping carrier endless belts intersecting the line of travel of the first belt and disposed between the stripping rolls adapted to catch the initially stripped stems and draw the leaves angularly away from the first gripping carrier and through the second stripping rolls.

17. In a tobacco leaf stemming machine, rotatable roll strippers radially secured to said member and arranged in segments, a longitudinal, flexible flap secured to a roll adjacent a segment, and means presenting a leaf to the stripping action.

18. In a tobacco leaf stemming machine, rolls comprising relatively rigid and resilient coacting strippers, a coacting flexible member having a portion expanding under the influence of centrifugal force and yielding under radial pressure, and means presenting the leaf to the stripping action.

19. In a tobacco leaf stemming machine, coacting rolls comprising relatively rigid, radially yieldable and relatively soft resilient members secured to the rolls, and means presenting the leaf to the stripping action.

20. In a machine of the class described, a roll having longitudinal binders, resilient strippers closely compacted between said binders, forming a yielding surface extending radially beyond the binders, there being non-stripping roll surfaces defined by the binders, and means gripping one end of the leaf and drawing the other end of the leaf into operative relation with the roll.

21. In a tobacco leaf stemming machine, a roll having brush material radially extending from the axis and closely compacted circumferentially, forming a yielding peripheral stripping surface, and binding members longitudinally projected from the roll and extending axially, but terminating below the brush surface, and means gripping one end of the leaf and drawing the other end of the leaf into operative relation with the roll.

22. In a tobacco leaf stemming machine, a roller having a peripheral brush surface of closely intermixed and compacted fiber and metallic wire, constituting differentially resilient stripping elements, disposed in longitudinally extending segments with spaces intervening.

23. In a tobacco leaf stemming machine, a roller, having a yielding fibrous interrupted peripheral surface with metallic wire embedded therein to form differential resilient stripping elements compactly massed into a series of successive stripping segments.

24. In a tobacco leaf stemming machine, a stripping roller, the priphery of which is formed with a series of pockets extending from one end of the roll to the other and separated from one another circumferentially of the roll, fiber and metallic wire closely compacted within each pocket, so as to yield relatively freely in a direction endwise of the roller, thereby forming on each roll a stripping surface, each having differential resilient characteristics.

25. In a tobacco leaf stemming machine, a stripping roll comprising brush material radially projected from the axis of the roll, longitudinally extending binders projecting radially from the axis of the roll, the brush material being compacted between said binders, so as to yield or flex relatively freely in a direction endwise of the roll and less freely in a direction circumferentially of the roll, the extremities of the brush material projecting radially beyond the ends of the binders and forming a segmental yielding stripping surface.

26. In a tobacco leaf stemming machine, a stripping roll composed of closely compacted brush-like material radially projected from the axis of the roll and forming a circumferential stripping surface, the extremities of the brush forming the surface being coated with a mucilaginous substance.

27. In a tobacco leaf stemming machine, a pair of carrier belts adapted to grip the stem between their adjacent surfaces, a strip of resilient metal bearing upon a given section of one of the belts, a series of closely arranged and independently actuated spring plungers bearing upon said yielding strip of metal to increase the gripping efficiency of the belts and to provide yielding accommodation for the inequalities of a plurality of stems concurrently passing the plungers.

28. In a tobacco leaf stemming machine, a stem gripping carrier, an angularly disposed pair of stripping rolls operating in opposition to the pull of the carrier, and a pair of rejecting rolls, one having flexible repellers radially projected from the periphery disposed in front of the stripping rolls and rotating in directions tending to throw out short leaves.

29. In a tobacco leaf stemming machine, a stem gripping carrier, an angularly disposed pair of stripping rolls operating in opposition to the pull of the carrier, a pair of rejecting rolls disposed in front of the said rolls and rotating in a direction tending to throw out short leaves, and a blower interposed between the rejecting and stripping rolls adapted to influence the rejection of broken or short leaves preventing them from entering the stripping rolls.

30. In a tobacco leaf stemming machine, two sets of coacting stem gripping carriers and stripping rolls, arranged to initially grip the tip portion of the leaf and strip the butt portion of the stem counter to the leaf grain, then to grip the initially stripped butt portions of the stems drawing the initially gripped tip portion of the leaf from the initial gripping carrier and between the second stripping rolls, stripping in a direction toward the tip or in the general direction of the leaf grain.

31. In a tobacco leaf stemming machine, two stem gripping carriers, stripping rolls coöperating with said carriers, one set of rolls having minor efficiency and the other set of rolls major efficiency stripping elements, the rolls and carriers being relatively arranged to enable one portion of the leaf to be drawn through the rolls having the minor elements in a direction toward the butt, and the other portion of the leaf to be drawn through the rolls having the major elements in a direction toward the tip.

32. In a tobacco leaf stemming machine, two sets of endless stem gripping carriers, the first adapted to hold the tip portion of the leaf, and the second to catch and hold the initially stripped butt portion of the stem, rolls having stripping elements disposed to coöperate with said carriers, the stripping elements of one pair of rolls being of minor efficiency as compared to the stripping elements of the other pair of rolls, and means for rotating said carriers and rolls in appropriate directions, one pair of rolls rotating relatively at a higher speed ratio than the other pair of rolls, one carrier being driven at a relatively faster rate of travel than the other carrier, enabling one operation to strip from an intermediate portion of the leaf toward the butt, counter to the leaf grain, and the other operation to strip the tip portion of the leaf in a general direction toward the tip or with the leaf grain.

33. In a tobacco leaf stemming machine, two sets of endless stem gripping carriers, the first adapted to hold the tip portion of the leaf, and the second to catch and hold the initially stripped butt portion of the stem, rolls having stripping elements disposed to coöperate with said carriers, the stripping elements of the first rolls being of minor efficiency as compared to the stripping elements of the second rolls, and means for rotating said carriers and rolls in appropriate directions, the second rolls rotating relatively at a higher speed ratio than the first rolls, enabling the first operation to strip from an intermediate portion of the leaf toward the butt, counter to the leaf grain, and the second operation to strip the tip portion of the leaf in a general direction toward the tip or with the leaf grain.

34. In a tobacco leaf stemming machine, two sets of endless stem gripping carriers, the first adapted to hold the tip portion of the leaf, and the second to catch and hold the initially stripped butt portion of the stem, rolls having stripping elements disposed to coöperate with said carriers, the stripping elements of the first rolls being of minor efficiency as compared to the stripping elements of the second rolls, and means for rotating said carriers and rolls in appropriate directions, enabling the first operation to strip from an intermediate portion of the leaf toward the butt, counter to the leaf grain, and the second operation to strip the tip portion of the leaf in a general direction toward the tip or with the leaf grain.

35. In a tobacco leaf stemming machine, a roll having closely compacted relatively soft resilient material radially secured to the roll, and relatively harsh resilient stripping elements embedded into the soft material, constituting stripping elements of differential resilience, and means limiting the depth of stem embedment into the yielding surface so formed.

36. In a tobacco leaf stemming machine, a roll, closely compacted resilient stripping elements radially projected from the roll, and a series of axial binders for the stripping elements terminating below the peripheral surface and adapted to limit the depth of stem embedment into the yielding surface formed by the projecting extremities of the strippers.

37. In a tobacco leaf stemming machine, a roll, stripping elements of different material and different resilience closely compacted and radially secured to said roll.

38. In a tobacco leaf stemming machine, a roll formed with axially extending under cut grooves and resilient material radially extended from and anchored in said grooves, said material being laterally compacted between the shoulders defined by said under cut formations.

39. In a tobacco leaf stemming machine, a roll formed with axially extending under cut grooves, resilient fibers and wires radially projecting from said grooves, the wires being anchored in the direction toward the axis, said intermixed components being laterally compacted and secured between the shoulders defined by said under cut formations.

40. In a tobacco leaf stemming machine, a stem gripping carrier comprising two endless belts, the gripping surfaces having a tongue and groove formation, coöperating stripping devices, and tension mechanism coöperating with the opposing belt faces to influence the gripping force while the leaf is being traversed through the stripping zone.

41. In a tobacco leaf stemming machine, a pair of rolls having circumferential portions, one of said rolls having a tapered end for stem entrance to said circumferential portions, each roll having a series of axially extending resilient strippers arranged with intervening spaces, said rolls being set with the stripping members of one roll intermeshing with the axial spaces of the opposing roll.

42. In a tobacco leaf stemming machine, a pair of endless carrier belts adapted to grip the stems, a pair of angularly disposed stripping rolls, and a series of independent tension devices pressing the gripping surfaces of the belts yieldingly together, said tension devices being disposed to augment the grip on the stems during the period when they are subjected to the counter-drag of the stripping rolls, and to automatically accommodate the gripping elements to inequalities of the products.

43. In a tobacco leaf stemming machine, a roll having stripping elements, and a flexible flap secured to the roll and radially projactable beyond the outer extremities of said stripping elements 44. In a tobacco leaf stemming machine, a roll, resilient stripping elements arranged to form a longitudinal segment of the roll and radially projecting therefrom, and members longitudinally extending across said roll and radially projected therefrom laterally compacting the projecting portions of said stripping elements causing said elements to flex in a direction generally endwise of the roll instead of circumferentially when a stem is embedded into the surface formed by the outer extremities of the compacted stripping elements.

45. In a tobacco stemming machine, two stem gripping carriers, stripping rolls coacting with said carriers respectively, said carriers having a common stem gripping zone intermediate the two sets of stripping rolls, and said carriers being arranged for transposing the order of leaf advancement intermediate the two stripping operations, enabling the leaf to be drawn tip foremost for one stripping and butt foremost for the other stripping, the stem being gripped and drawn substantially in the same way for each operation.

46. In a tobacco stemming machine, means for gripping and drawing one end of a leaf, a coacting pair of stripping rolls, and a centrifugally expanded and radially yieldable roll member coöperating with roll stripping elements.

47. In a tobacco stemming machine, means for gripping and drawing a leaf end, a coacting pair of stripping rolls, and radially projecting longitudinally extending stripping segments on said rolls, operating upon opposite sides of the leaf, with circumferential openings defined by the segments.

48. In a tobacco stemming machine, a stem gripping carrier, a pair of stripping rolls formed with radially projected, longitudinally extending stripping surfaces, with circumferential openings defined by the segments, and a flexible member secured to the non-stripping surface of a roll adjacent a segment, having a centrifugally expanded and radially yielding surface operating under the influence of roll rotation to urge the leaf toward one stripping segment and away from the segment of the roll to which said member is attached.

49. In a tobacco stemming machine, a stem gripping carrier, a pair of stripping rolls formed with radially projected, longitudinally extending stripping surfaces, with circumferential openings defined by the segments, a flexible member secured to the non-stripping surface of a roll adjacent a segment, having a centrifugally expanded and radially yielding surface operating under the influence of roll rotation to urge the leaf toward one stripping segment and away from the segment of the roll to which said member is attached, and means laterally confining the segments and limiting the depth of stem embedment into a stripping segment.

50. In a tobacco stemming machine, stem gripping carrier belts, and an angularly disposed pair of stripping rolls having coacting stripping segments with non-stripping surfaces defined by the segments, one of the rolls having a tapered end adjacent the carrier, the stripping segment extending longitudinally on said tapered end, the gripping belt runs passing between the end opening between the rolls defined by said taper formation.

51. In a tobacco stemming machine, two sets of stem gripping carriers and stripping rolls arranged for sequential and coördinate operation, the stripping being toward the butt in one instance and toward the tip in the other instance, said rolls having stripping and non-stripping surfaces, and said stripping surfaces constituting a major and a minor efficiency stripping in the sequential operations.

52. In a tobacco stemming machine, two sets of stem gripping carriers and stripping rolls arranged for sequential and coördinate operation, the stripping being toward the butt in one instance and toward the tip in the other instance, said rolls having stripping and non-stripping surfaces, said stripping surfaces constituting a major and a minor efficiency stripping in the sequential operations, and the stripping surfaces of each pair of rolls having a differential stripping efficiency.

In testimony whereof, I have hereunto set my hand.

JAMES P. SCOVILL.

Witnesses:
 OLIVER B. KAISER,
 EMMA SPENER.